(12) United States Patent
Hostetler et al.

(10) Patent No.: US 11,358,232 B2
(45) Date of Patent: Jun. 14, 2022

(54) ROUNDED NUT FILES FOR STRINGED INSTRUMENTS

(71) Applicant: Stewart-MacDonald Manufacturing Company, Athens, OH (US)

(72) Inventors: Jay Hostetler, Athens, OH (US); Don MacRostie, Athens, OH (US); Todd Sams, Athens, OH (US)

(73) Assignee: STEWART-MACDONALD MANUFACTURING COMPANY, Athens, OH (US)

( * ) Notice: Subject to any disclaimer, the term of this patent is extended or adjusted under 35 U.S.C. 154(b) by 0 days.

(21) Appl. No.: 16/756,050

(22) PCT Filed: Oct. 15, 2018

(86) PCT No.: PCT/US2018/055884
§ 371 (c)(1),
(2) Date: Apr. 14, 2020

(87) PCT Pub. No.: WO2019/079183
PCT Pub. Date: Apr. 25, 2019

(65) Prior Publication Data
US 2020/0306850 A1    Oct. 1, 2020

Related U.S. Application Data

(60) Provisional application No. 62/572,659, filed on Oct. 16, 2017.

(51) Int. Cl.
*B23D 71/04* (2006.01)
*B23D 71/08* (2006.01)
(Continued)

(52) U.S. Cl.
CPC ............. *B23D 71/04* (2013.01); *B23D 71/08* (2013.01); *G10D 3/06* (2013.01); *G10D 3/12* (2013.01); *G10G 7/00* (2013.01)

(58) Field of Classification Search
CPC ............... G10G 7/00; G10D 3/06; B23D 1/08
See application file for complete search history.

(56) References Cited

U.S. PATENT DOCUMENTS 2,089,619 A    8/1937  Ripley
2,664,017 A *  12/1953 Cox ......................... B25G 1/00
                                                          76/36
(Continued)

FOREIGN PATENT DOCUMENTS

CN    202317272 U    7/2012
CN    103231122 A    8/2013
(Continued)

OTHER PUBLICATIONS

Webpage Titled "Facts on files" Accessed Jan. 16, 2017. URL: http://www.simondsint.com/handfiles/HAND%20FILES%20PUBLICATIONS/File%20Facts.pdf.
(Continued)

*Primary Examiner* — Robert W Horn
(74) *Attorney, Agent, or Firm* — Dinsmore & Shohl LLP

(57) ABSTRACT

The diamond tipped nut filing tool includes a body and a diamond tipped file. The diamond tipped file may be disposed along one end of the body. The body has a longitudinal length and at least half of the length includes a circumference so that at least one half of the longitudinal length is rounded.

9 Claims, 3 Drawing Sheets

(51) Int. Cl.
*G10D 3/06* (2020.01)
*G10D 3/12* (2020.01)
*G10G 7/00* (2006.01)

(56) References Cited

U.S. PATENT DOCUMENTS

| | | | | |
|---|---|---|---|---|
| 2,815,686 | A * | 12/1957 | Harrison | B23D 67/00 |
| | | | | 76/37 |
| 3,046,204 | A * | 7/1962 | Barron | B24D 18/00 |
| | | | | 205/114 |
| 3,354,753 | A * | 11/1967 | Kennemore | B23D 63/162 |
| | | | | 76/37 |
| 3,956,858 | A * | 5/1976 | Catlin | B23D 65/00 |
| | | | | 451/525 |
| 4,037,210 | A | 7/1977 | Sharp | |
| 4,079,552 | A * | 3/1978 | Fletcher | B24D 18/0018 |
| | | | | 51/295 |
| 4,190,958 | A * | 3/1980 | Martin | A61C 3/02 |
| | | | | 433/102 |
| 4,311,078 | A | 1/1982 | Falgares | |
| 4,830,615 | A * | 5/1989 | Goldstein | A61C 3/06 |
| | | | | 433/142 |
| 4,869,788 | A * | 9/1989 | Tezuka | A61C 3/02 |
| | | | | 205/110 |
| RE33,767 | E * | 12/1991 | Christini | C23C 18/1651 |
| | | | | 428/544 |
| 5,658,184 | A * | 8/1997 | Hoopman | B24D 3/28 |
| | | | | 451/28 |
| 6,142,715 | A * | 11/2000 | Fontaine | B23D 57/0076 |
| | | | | 407/29.1 |
| 6,379,155 | B1 * | 4/2002 | Riitano | A61C 5/42 |
| | | | | 433/102 |
| 6,565,356 | B2 * | 5/2003 | Oyamada | A61C 3/02 |
| | | | | 433/165 |
| 7,750,217 | B2 * | 7/2010 | Decker | G10D 3/12 |
| | | | | 84/314 N |
| 8,109,763 | B2 * | 2/2012 | Levy | A61C 5/42 |
| | | | | 433/102 |
| 8,372,086 | B2 * | 2/2013 | Lind | A61B 17/54 |
| | | | | 606/131 |
| 8,506,295 | B2 * | 8/2013 | Rek | A61C 3/06 |
| | | | | 433/166 |
| 8,523,966 | B2 * | 9/2013 | Cantoni | A61C 3/02 |
| | | | | 51/293 |
| 9,224,369 | B2 | 12/2015 | Bissoli | |
| 10,053,994 | B2 * | 8/2018 | Stratton | B23K 1/0018 |
| 10,586,517 | B2 * | 3/2020 | Dickinson | G10D 3/06 |
| 10,722,962 | B2 * | 7/2020 | Kanazawa | B23D 61/185 |
| 2005/0139395 | A1 * | 6/2005 | Shaygan | B23B 51/00 |
| | | | | 175/374 |
| 2005/0282112 | A1 * | 12/2005 | Kumar | A61C 3/02 |
| | | | | 433/141 |
| 2006/0269901 | A1 * | 11/2006 | Rosenblood | A61C 1/07 |
| | | | | 433/166 |
| 2009/0049700 | A1 * | 2/2009 | Frankl | B23D 51/01 |
| | | | | 30/517 |
| 2013/0032129 | A1 * | 2/2013 | Otani | B24D 99/00 |
| | | | | 125/12 |
| 2017/0151652 | A1 | 6/2017 | Ogura | |
| 2018/0061378 | A1 * | 3/2018 | Berg | G10D 3/12 |
| 2020/0282519 | A1 * | 9/2020 | Hostetler | B24D 18/0018 |
| 2020/0306850 | A1 * | 10/2020 | Hostetler | G10G 7/00 |

FOREIGN PATENT DOCUMENTS

| | | |
|---|---|---|
| CN | 203265790 U | 11/2013 |
| GB | 456868 A | 11/1936 |
| JP | 4583274 B2 | 11/2010 |

OTHER PUBLICATIONS

International Search Report and Written Opinion dated Dec. 14, 2018 in related International Application No. PCT/US2018/055884.
International Preliminary Report on Patentability dated Apr. 29, 2020 in related International Application No. PCT/US2018/055884.
ALS #5001 Guitar Nut File Set by Uo-Chikyu Hiroshima—8 piece double-sided 10-56, first listed for sale on Amazon.com on Apr. 5, 2016.

* cited by examiner

ROUNDED NUT FILES FOR STRINGED INSTRUMENTS

CROSS-REFERENCE TO RELATED APPLICATION

This application claims the benefit of U.S. Provisional Application Ser. 62/572,659, filed Oct. 16, 2017 which is hereby incorporated by reference in its entirety.

TECHNICAL FIELD

Embodiments of the present disclosure generally relate to stringed instrument nut filing tool, and more particularly to a stringed instrument nut filing tool that is rounded nut and yields a rounded final product.

BACKGROUND

All strings pass through a nut at the headstock end of the fretboard or fingerboard. The function of the nut is to maintain correct string spacing and alignment so that the strings feed into their respective tuning pegs. The nut is placed at the end of the fingerboard and controls the strings spacing, distance from the edge of the fingerboard and their height above the first fret. Nuts can be made from a variety of materials and require adjustment or replacement when wear and tear creates problems. While pre-slotted and shaped are available for retail, many of the pre-slotted nuts need to be filed to ensure that their width and depth create the correct string height. Additionally, nut that are not pre-slotted need to be filed.

Filing tools have many purposes, such as smoothing and cutting, and include teeth, which are cut into the body of the file. The teeth may be cut into the filing tool after shaping the tool. The term "cut" refers the file teeth. Most modern filing tools may include single-cut, double-cut, curved-cut or rasp-cut. In most cases, the teeth are cut into the file, thereby removing a portion of the material of the tool.

Filing tools typically have two basic shapes: flat or triangular. These two basic shape produce two basic shapes as the final products: an angular shape and a flat shape. However, the shape of the strings on a stringed instrument is not flat or angular.

SUMMARY

Ongoing needs exist to create a file that is rounded as to yield carved products with a rounded final product. The rounded product may easily hold rounded objects such strings or wires.

According to an embodiment of the present disclosure, a diamond tipped nut filing tool is disclosed. The diamond tipped nut filing tool includes a body and a diamond tipped file. The diamond tipped file may be disposed along one end of the body. The body has a longitudinal length and at least half of the longitudinal length includes a circumference so that at least one half of the longitudinal length is rounded.

According to another embodiment of the present disclosure, a nut of a stringed instrument comprises a slot with a least one rounded bottom.

BRIEF DESCRIPTION OF FIGURES

The following detailed description of specific embodiments of the present disclosure can be best understood when read in conjunction with the following drawings, where like structure is indicated with like reference numerals and in which.

DETAILED DESCRIPTION

Specific embodiments of the present disclosure will now be described. The different embodied forms should not be construed as limited to the embodiments set forth herein. Rather, these embodiments are provided so that this disclosure will be thorough and complete, and will fully convey the scope of the present disclosure to those skilled in the art.

Unless otherwise defined, all technical and scientific terms used herein have the same meaning as commonly understood by one of ordinary skill in the art. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing distance, size, or other dimension that are modified by the term "about" as used in the specification and claims are to be understood to vary to the smallest significant figure. Additionally, the disclosure of any ranges in the specification and claims are to be understood as including the range itself and also anything subsumed within the range, as well as endpoints. Unless otherwise indicated, the numerical properties set forth in the specification and claims are approximations that may vary depending on the desired properties sought to be obtained in embodiments of the present disclosure. Notwithstanding that numerical ranges and parameters setting forth the broad scope of the disclosure are approximations, the numerical values set forth in the specific examples are reported as precisely as possible. Any numerical values, however, inherently contain certain errors necessarily resulting from error found in their respective measurements.

One or more embodiments of a diamonded tipped nut filing tool (herein diamond tipped nut file) according to this disclosure include a body and a diamond tipped file. The diamond tipped file may be disposed on one end of the body. The body has a longitudinal length and at least half of the length includes a circumference so that at least one half of the longitudinal length is rounded.

Figure 1A:
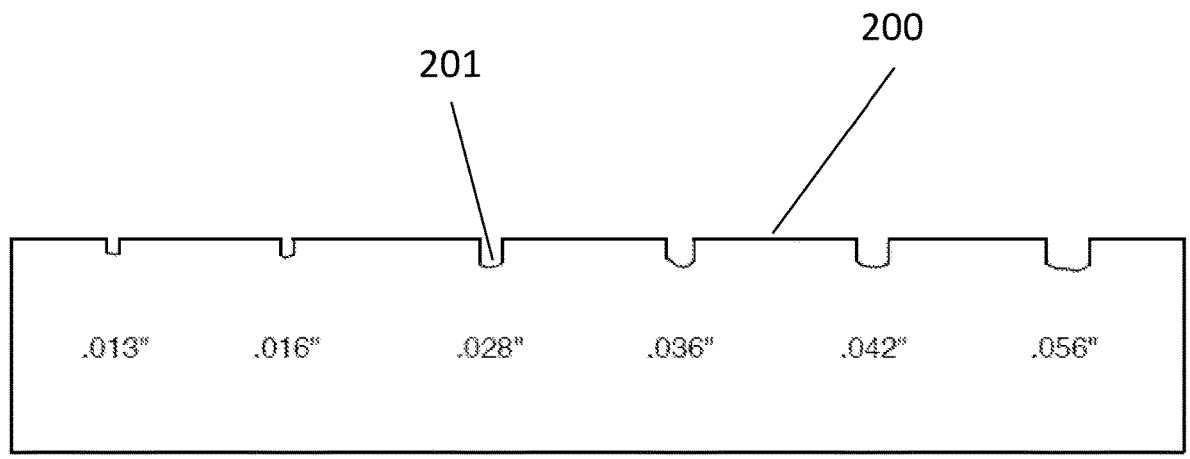
FIG. 1A is a perspective view of a stringed instrument nut with slots carved with a file with cut teeth according to the prior art.
Figure 1B:
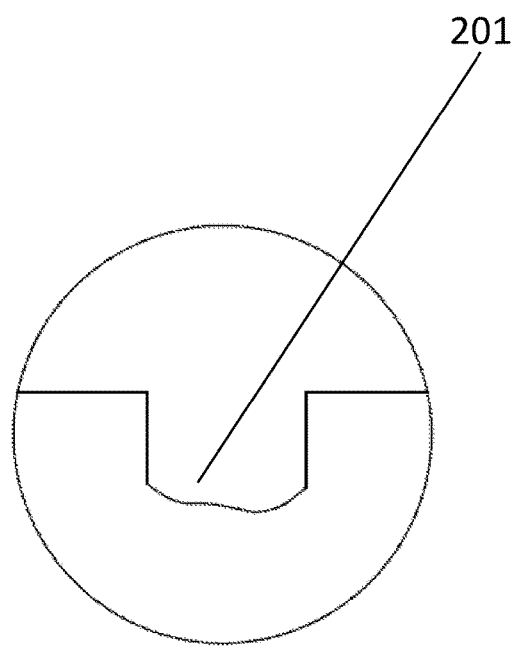
FIG. 1B is magnified view of slots in a stringed instrument nut when carved with file with cut teeth as shown in FIG. 1A.

Referring to FIG. 1A and FIG. 1B, an illustration of a slot 201 of a nut 200 is shown. The slot 201 is formed with an initially round object, in which teeth were cut into the file. As shown in FIG. 1A and FIG. 1B, slot 201 does not have a rounded bottom. The lack of roundness affects the positioning or hold of the string.

Figure 2:
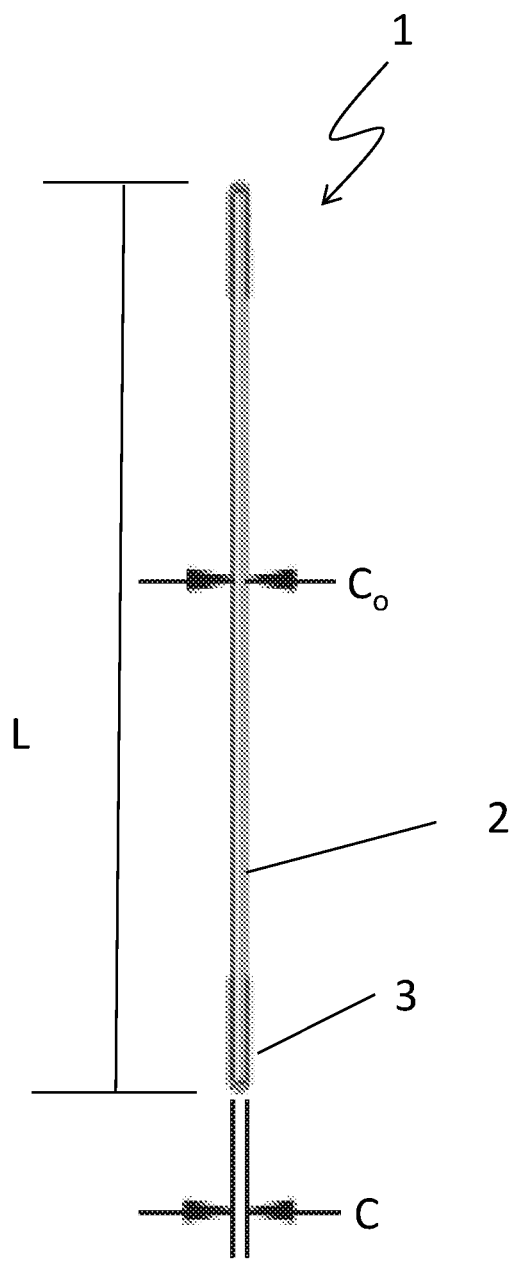
FIG. 2 shows a one-dimensional edge view of a diamond tipped filing tool in accordance with one or more embodiments shown or described herein.

Referring to FIG. 2, an illustration of a diamond tipped nut file 1 according to an embodiment of this disclosure is shown. The diamond tipped nut file 1 includes a body 2 having a rod shape, as indicated by the initial circumference $C_o$ and the longitudinal length L, and a diamond tipped file 3 having a circumference C. The circumference C has a rounded surface.

In another embodiment of the diamond tipped nut file 1, at least half of the longitudinal length L of the body is circular, thereby providing the body 2 of the diamond tipped nut file 1 has a semi-circular shape. The body 2 may be made of a metal such as, but not limited to, alloys such as stainless steel (SS) 304 and SS 316 or tool grade steel.

In a stringed instrument, the position of the strings along the width of the instrument is controlled by the slots in the nut. The slots in the nut also control the height of the strings on a stringed instrument. Both the height and positioning of the strings can affect the notes and sound quality of the stringed instrument. Generally, a file is used to form slots in the nut to maintain positioning and height of the strings. Most nut files are flat and formed by cutting teeth into the surface of the filing tool. Typically, the teeth are formed in a double cut pattern as to file the nut using a pushing and pulling motion. To ensure a smooth slot, there are many teeth in the nut filing tools. Flat nut files create square slots on the nut. The square slots are not able to cradle the strings, thereby allowing the strings to move slightly, which may affect and alter the sound. The shape of the files that are initially rounded is lost when teeth are cut into the surface. The numerous teeth cut into the file alter the roundness. As the teeth are cut into the file, shards or shaving of the file are removed to form the teeth and the general round surface is distorted. Since multiple teeth are formed, the shape is altered and the roundness lost.

Figure 3A:
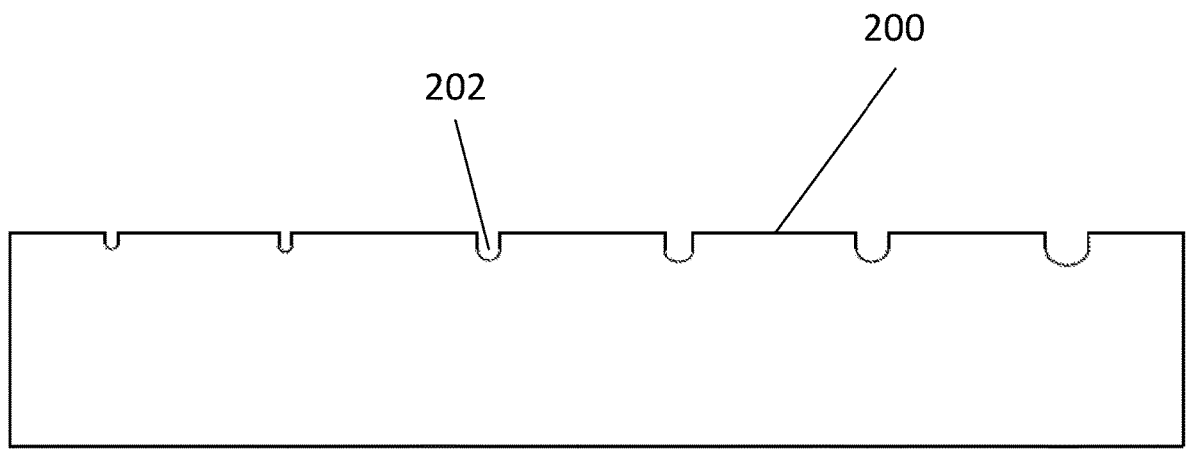
FIG. 3A is a perspective view of a stringed instrument nut with slots carved with the diamond tipped nut file of FIG. 2.
Figure 3B:
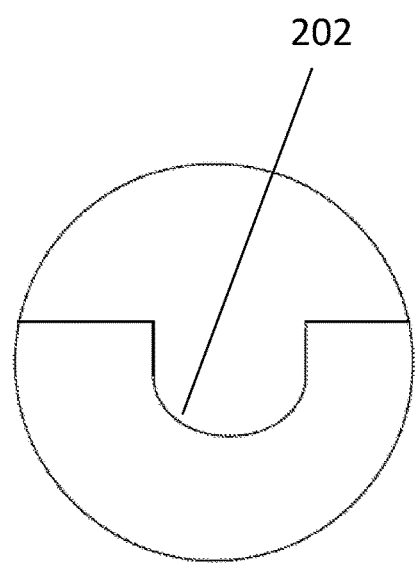
FIG. 3B is magnified view of slots in a stringed instrument nut when carved with the diamond tipped nut file of FIG. 2.

As shown in FIG. 3A and FIG. 3B, slot 202 in nut 200 has a rounded configuration and was formed by a diamond tipped nut file. Slot 202 can more easily cradle a string than slot 201, thereby maintaining the positioning and height of the string. While a string may fit into slot 201, the uneven bottom will not cradle the string as well as a more evenly rounded bottom could, therefore affecting the positioning and height of the string, which may alter the sound.

The roundness of slot 202 is maintained because the diamond tipped file is formed by electrodepositing the diamond particles on to the body 2. Electrodepositing diamond particles does not alter the shape of the body, so the diamond nut file maintains a rounded surface or a circumference. To form the diamond tipped nut file 1, a portion of the body 2 is coated with a metal plating, and diamond particles are electrodeposited onto the metal plating. Within the present context, the term "diamond particles" refers to crystallized material having a hardness from 7 to 10 on the Mohs scale of hardness regardless of the actual chemical makeup of such material. Examples of material used to form the diamond particles may include diamonds (with a hardness of 10), moissanite (with a hardness of 9.5), cubic zirconium (with a hardness of 8-8.5), or quartz (with a hardness of 7).

In one or more embodiments, the metal used to plate or coat a portion of the body 2 may be any metal that conducts a current, such as nickel, copper, gold, aluminum, zinc, brass, or iron. The metal plating may have a thickness less than 0.002 inch or may be from approximately 0.001 inch to approximately 5 μm. The metal plating and the diamond particles may be added through various electrodepositing methods such as pulse electroplating, brush electroplating, or electrochemical deposition.

In one or more embodiments, a thin layer of metal is depositing onto a portion of the body 2 using electrolysis to form the metal plating. After the portion is coated with the metal plating, the diamond particles are electroplated form a circumference C. The diamond particles may be suspended in a metal plating solution. As a current is conducted through the metal plating on the body 2, the diamond particles and metal plating solution are deposited on the metal plating. The metal plating on body 2 is connected to a circuit and functions as a cathode. The metal plating is submerged into the metal plating solution, and, as the metal is deposited, the diamond particles are occluded in the plating. The diamond particles are added until the circumference has a specific diameter.

The specific diameter of the diamond nut file correlates to the size of the string. The opening of the slot should be wide enough to fit the string, but not too wide as to allow movement. For example, the size of a D-string is 0.0100 inch, which means the slot is slightly larger, approximately 0.013 inches. The diameter of the circumference of the diamond tipped file 3 may range from 0.013 inches to 0.056 inches. Many different sizes are contemplated. The diameter of the circumference of the diamond tipped file 3 may be 0.013, 0.016, 0.028, 0.036, 0.042, or 0.056 inches.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A nut filing tool for a stringed instrument, the nut filing tool comprising a body and a diamond tipped file, wherein the diamond tipped file has a uniformed circumference the diameter of which corresponds to the size of string to be placed within a nut of the stringed instrument, wherein upon engagement of the nut filing tool with the nut of the stringed instrument a slot with a substantially rounded recess formed therein.

2. The nut filing tool of claim 1, wherein the diamond tipped file is disposed at one end of the body.

3. The nut filing tool of claim 1, wherein the body further comprises a longitudinal length, wherein at least half of the longitudinal length has a rounded surface.

4. The nut filing tool of claim 1, wherein the body comprises steel.

5. The nut filing tool of claim 1, wherein the body further comprises a rod shape and an initial circumference.

6. The nut filing tool of claim 1, wherein the circumference of the diamond tipped file comprises a diameter of from approximately 0.013 inches to approximately 0.056 inches.

7. The nut filing tool of claim 1, wherein the circumference of the diamond tipped file is greater than the initial circumference.

8. A plurality of nut filing tools for a stringed instrument, each nut filing tool comprising a body and a diamond tipped file that defines uniformed circumference the diameter of which corresponds to a string to be placed within a nut of the stringed instrument, wherein when each nut filing tool engages with the nut of the stringed instrument a plurality of substantially rounded slots are formed, each slot having a different size opening.

9. The plurality of nut filing tools according to claim 8, wherein:
a first nut filing tool of the plurality of nut filing tools comprises a diameter of approximately 0.013 inches;

a second nut filing tool of the plurality of nut filing tools comprises a diameter of approximately 0.016 inches;
a third nut filing tool of the plurality of nut filing tools comprises a diameter of approximately 0.028 inches;
a fourth nut filing tool of the plurality of nut filing tools comprises a diameter of approximately 0.036 inches; and
a fifth nut filing tool of the plurality of nut filing tools comprises a diameter of approximately 0.042 inches; and
a fifth nut filing tool of the plurality of nut filing tools comprises a diameter of approximately 0.056 inches.

* * * * *